United States Patent
Deng et al.

(10) Patent No.: US 7,190,499 B2
(45) Date of Patent: Mar. 13, 2007

(54) LASER SCANNING UNIT

(75) Inventors: Jau-Jan Deng, Taipei (TW); Guo-Zen Chen, Taipei (TW); I-Lin Chu, Taipei (TW); Ming-Hua Wen, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 10/750,757

(22) Filed: Jan. 5, 2004

(65) Prior Publication Data

US 2005/0146764 A1    Jul. 7, 2005

(51) Int. Cl.
*G02B 26/08* (2006.01)

(52) U.S. Cl. .............................. 359/206; 359/872

(58) Field of Classification Search ............... 359/206, 359/205, 212, 871, 872
See application file for complete search history.

(56) References Cited

U.S. PATENT DOCUMENTS

| 5,363,200 | A * | 11/1994 | Frohbach et al. | ........... 386/113 |
| 6,271,514 | B1 * | 8/2001 | Thomas et al. | ............. 359/205 |
| 6,724,509 | B2 * | 4/2004 | Lee | ............................. 359/201 |
| 6,812,669 | B2 * | 11/2004 | Hagen | ........................ 318/629 |

* cited by examiner

Primary Examiner—Euncha P. Cherry
(74) Attorney, Agent, or Firm—Troxell Law Office PLLC

(57) ABSTRACT

A laser scanning unit mainly includes a semiconductor laser, a collimator, a micro electronic mechanic system (MEMS) oscillatory mirror, and an fθ lens or an f sin θ lens. The MEMS oscillatory mirror is disposed between the collimator and the fθ lens to replace a conventional rotary polygonal mirror for controlling a direction in which laser beams are projected from the oscillatory mirror to the fθ lens. With the MEMS oscillatory mirror, the cylindrical lens may be omitted from the laser scanning unit and noises produced by the polygonal mirror rotating at high speed may be avoided. Moreover, the MEMS oscillatory mirror allows bi-directional scanning to therefore enable increased scanning frequency, simplified structure, and improved scanning efficiency.

5 Claims, 5 Drawing Sheets

LASER SCANNING UNIT

FIELD OF THE INVENTION

The present invention relates to a laser scanning unit, and more particularly to a laser scanning unit that includes a micro electronic mechanic system (MEMS) oscillatory mirror disposed between a collimator and an fθ lens. The MEMS oscillatory mirror oscillates in harmonic motion to control a direction in which laser beams are projected and enables omission of a cylindrical lens from the laser scanning unit, so that the laser scanning unit may have reduced number of elements and improved scanning efficiency.

BACKGROUND OF THE INVENTION

There are many patents disclosing applied techniques in connection with laser beam printer (LBP). Examples of such patents include U.S. Pat. No. 5,128,795, U.S. Pat. No. 5,162,938, U.S. Pat. No. 5,329,399, U.S. Pat. No. 5,710,654, U.S. Pat. No. 5,757,533, U.S. Pat. No. 5,619,362, U.S. Pat. No. 5,721,631, U.S. Pat. No. 5,553,729, U.S. Pat. No. 5,111,219, U.S. Pat. No. 5,995,131, and Japanese patent Nos. 4-50908 and 5-45580. Most of the laser beam printers disclosed in these patents include a laser scanning unit (LSU) that uses a polygonal mirror, such as a quadrigonal or a hexagonal mirror, rotating at a speed as high as, for example, 40000/min, so as to control the laser beam scanning in the laser beam printer.

A conventional laser scanning unit 1 will now be described with reference to FIGS. 1, 1A, and 1B to explain the structure and optic path in general laser scanning units. As can be seen from FIG. 1, the laser scanning unit 1 includes a semiconductor laser 10 that serves as a light source to emit laser beams, which sequentially pass through an aperture 11 and a collimator 12. The laser beams pass through the collimator 12 to form parallel beams and then pass through a cylindrical lens 13, a main function of which is to cause a width of the parallel beams in a sub-major scanning direction or Y-axis to focus in a direction parallel to a major scanning direction or X-axis and thereby form a line image, which is a point in FIG. 1B. The laser scanning unit 1 also includes a polygonal mirror 14 that is adapted to rotate at high speed, so that a plurality of reflection mirrors 15 uniformly and continuously arranged on the polygonal mirror 14 are just located at or in the vicinity of a focal point of the above-mentioned line image. The polygonal mirror 14 serves to control a direction in which the laser beams are projected therefrom. The a plurality of continuous reflection mirrors 15 in high rotating speed are adapted to deflect and reflect laser beams incident on the reflection mirrors 15 in a direction parallel to the major scanning direction or X-axis to an fθ lens 16 at uniform angular velocity. The fθ lens 16 is located at one side of the polygonal mirror 14 and may be a single-element scanning lens, as shown in FIG. 1, or a two-element scanning lens, as that shown in the figures of U.S. Pat. No. 5,995,131. Laser beams incident on the fθ lens 16 via the reflection mirrors 15 on the polygonal mirror 14 are focused to form a circular light spot that is then projected onto a photoreceptor drum 17 to achieve a required scanning linearity. The above-described conventional laser scanning unit has the following problems in use:

1. The rotary polygonal mirror 14 in the conventional laser scanning unit 1 is very difficult to make and requires high manufacturing cost to increase the cost of the laser scanning unit.

2. Since the conventional polygonal mirror 14 must be able to rotate at a speed as high as, for example, 40000/min, and have high precision, the reflection mirrors 15 on the polygonal mirror 14 usually have a very small mirror width in the direction of Y-axis. Therefore, it is necessary to additionally provide a cylindrical lens 13 in the conventional laser scanning unit, so that laser beams passed through the cylindrical lens 13 are focused to form a line (or a point on Y-axis) before being projected onto the reflection mirrors 15 of the polygonal mirror 14. The conventional laser scanning unit therefore has increased number of elements and requires increased assembling operations.

3. The conventional polygonal mirror 14 rotate at high rotating speed, such as 40000/min, to produce relatively high noises. Moreover, a relatively long waiting period is required for the polygonal mirror 14 to reach a working rotational speed. That is, a long waiting period is needed after the laser scanning unit is turned on.

4. According to the assembling structure of the conventional laser scanning unit, laser beams projected onto the reflection mirrors 15 of the polygonal mirror 14 have a central axis that is not aligned with a central rotation axis of the polygonal mirror 14. When designing the fθ lens 16, it is necessary to consider a deviation from the axis of the polygonal mirror 14. Thus, it is more difficult to design and manufacture the fθ lens 16.

SUMMARY OF THE INVENTION

It is therefore a primary object of the present invention to provide an improved laser scanning unit, in which a micro electronic mechanic system (MEMS) oscillatory mirror is adopted to replace the conventional rotary polygonal mirror, so that the cylindrical lens for focusing laser beams in the direction of Y-axis is omitted from the laser scanning unit to reduce the number of elements for the laser scanning unit, and the noises produced during rotation of the polygonal mirror may be avoided, and the laser scanning unit may be started for use without waiting period.

Another object of the present invention is to provide an improved laser scanning unit having a MEMS oscillatory mirror that oscillates in harmonic motion to enable bi-directional scanning. Therefore, the laser scanning unit having the same operating speed as a conventional laser scanning unit may provide a scanning speed twice as quick as the conventional laser scanning unit, which uses the polygonal mirror to enable scan only in one direction. The laser scanning unit of the present invention therefore has increased scanning frequency and improved scanning efficiency.

A further object of the present invention is to provide an improved laser scanning unit having a MEMS oscillatory mirror, so that laser beams have a central axis aligned with a mechanical center of the MEMS oscillatory mirror. (that is, an oscillating center of the MEMS oscillatory mirror) to eliminate the problem of deviation of the central axis of laser beams from the central rotation axis of the polygonal mirror existed in the conventional laser scanning unit and to enable easy design and manufacture of the fθ lens.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
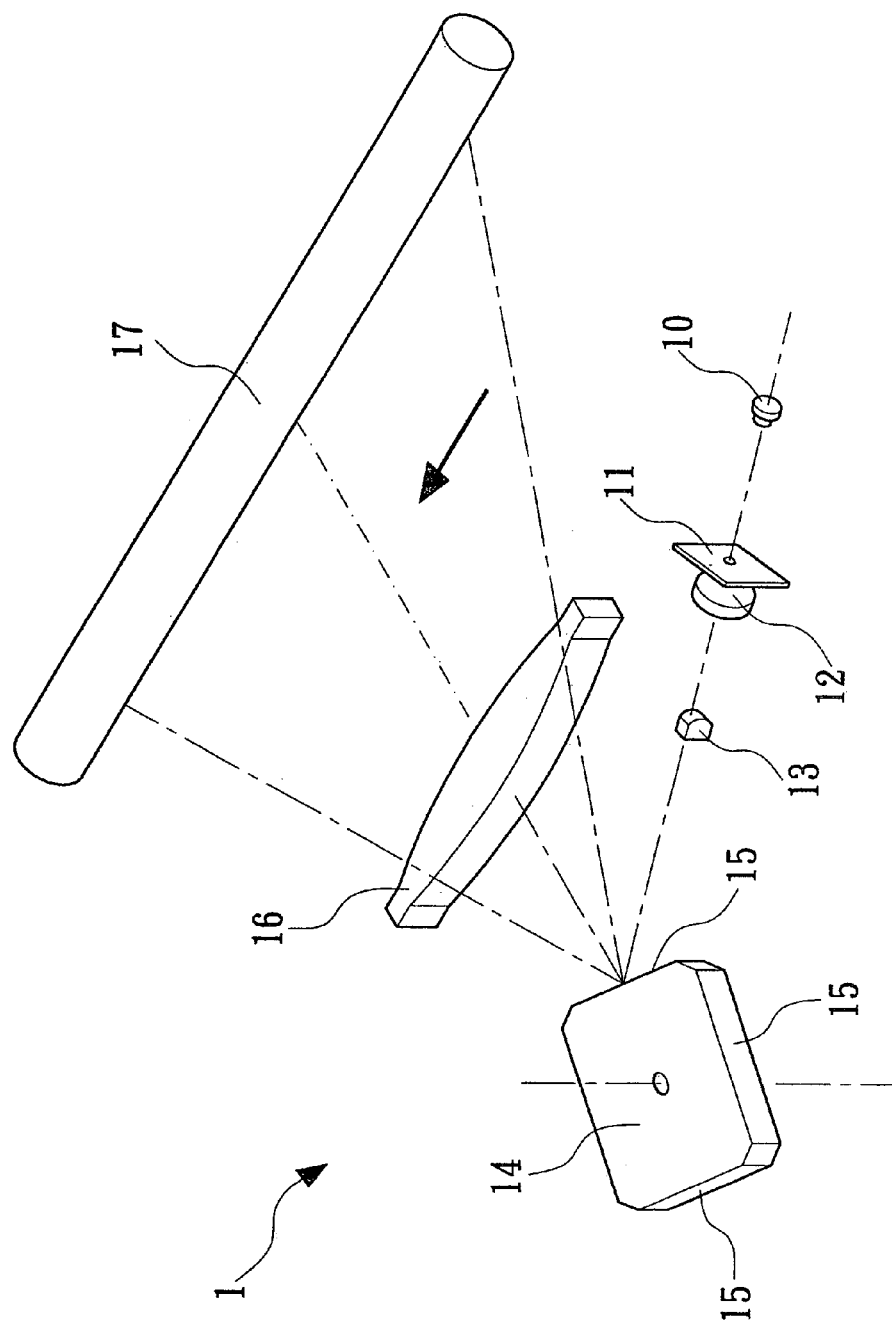
FIG. 1 is a perspective conceptual diagram explaining a conventional laser scanning unit.
Figure 1A:
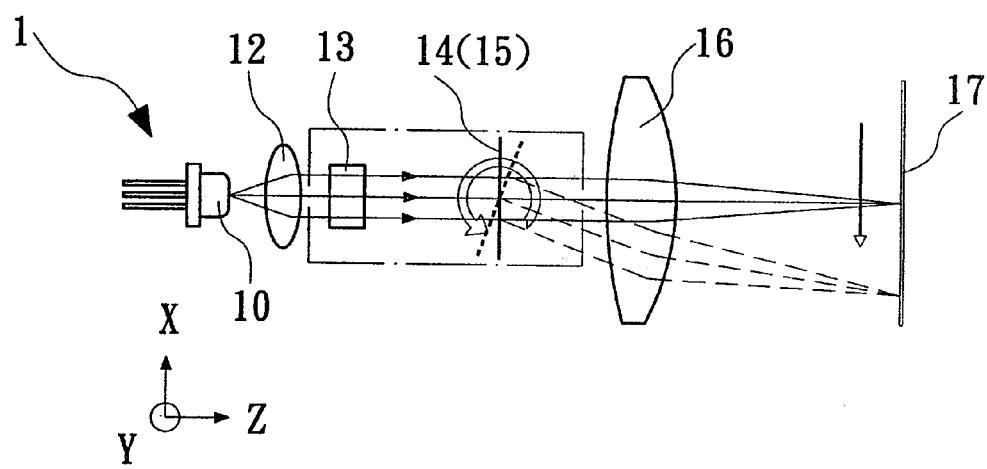
FIG. 1A is a top view explaining an optical path defined by the laser scanning unit of FIG. 1.
Figure 1B:
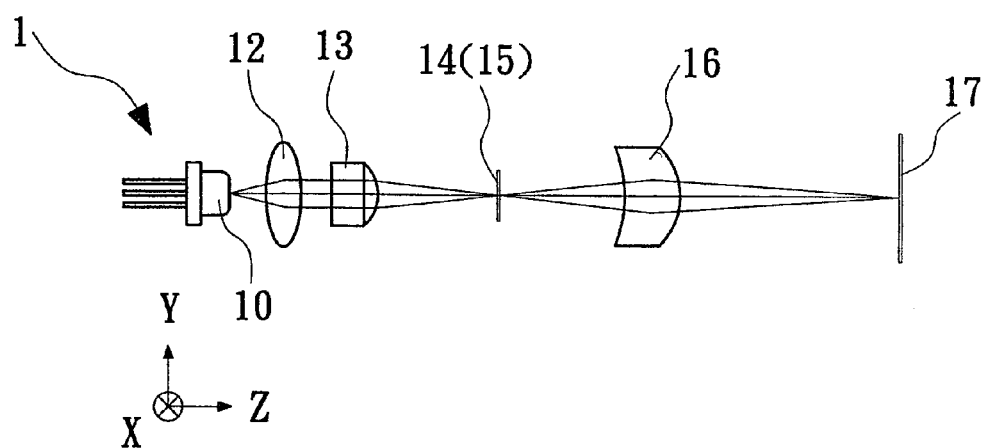
FIG. 1B is a side view of FIG. 1A.
Figure 2:
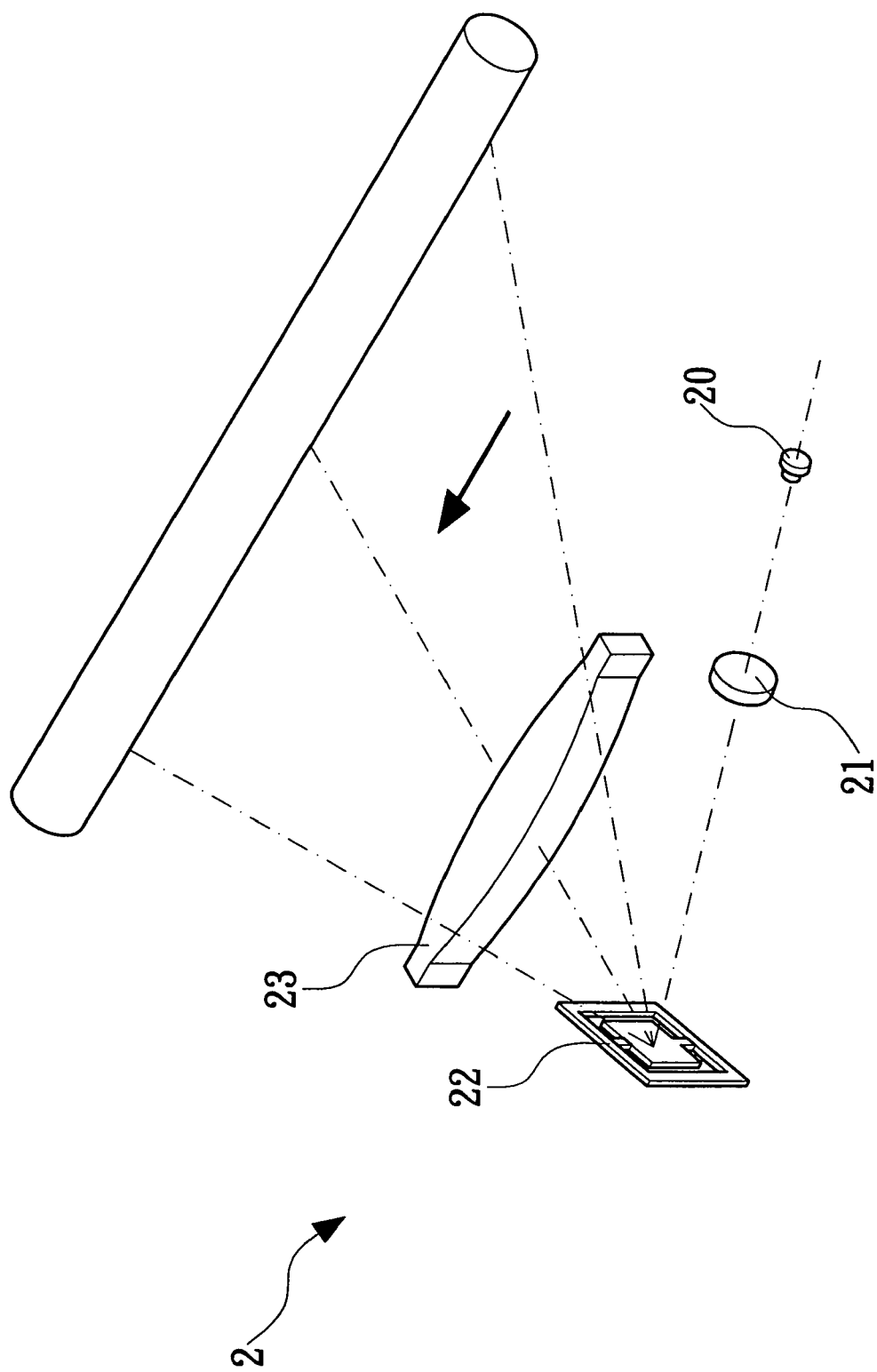
FIG. 2 is a perspective conceptual view explaining a laser scanning unit according to the present invention.
Figure 2A:
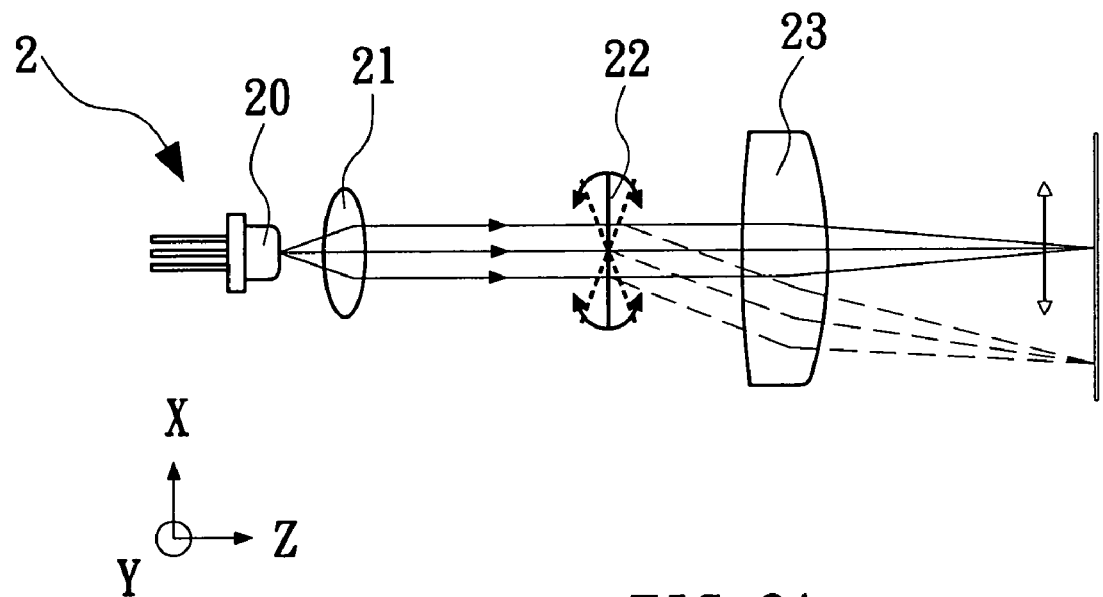
FIG. 2A is a top view explaining an optical path defined by the laser scanning unit of FIG. 2.
Figure 2B:
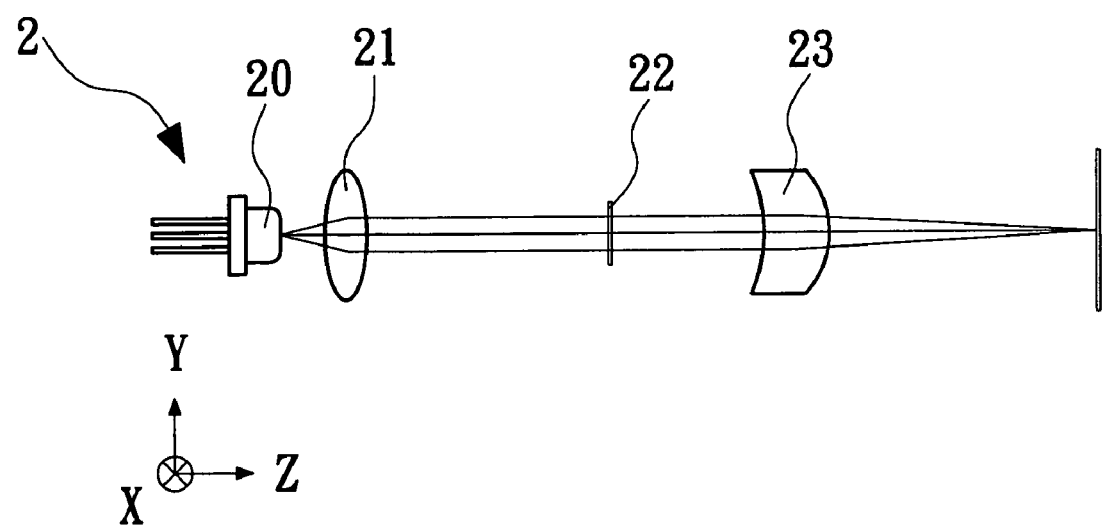
FIG. 2B is a side view of FIG. 2A.
Figure 2C:
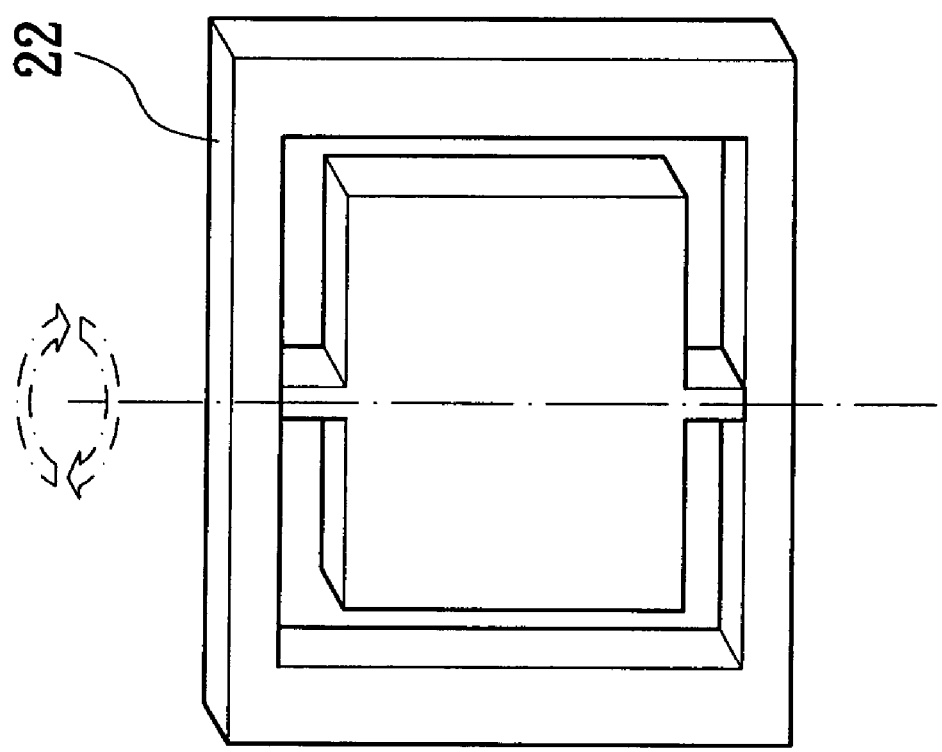
FIG. 2C is a perspective view of a MEMS oscillatory mirror adopted in the present invention.

Please refer to FIGS. 2, 2A, 2B, and 2C. A laser scanning unit (LSU) 2 according to the present invention mainly includes a semiconductor laser 20, a collimator 21, a micro electronic mechanic system (MEMS) oscillatory mirror 22, and an fθ lens 23. The laser scanning unit 2 is characterized in that the MEMS oscillatory mirror 22 substitutes for the rotary polygon mirror 14 in the conventional laser scanning unit 1, so that laser beams emitted from the semiconductor laser 20 pass the collimator 21 to form parallel beams, which are directly projected onto the MEMS oscillatory mirror 22 without the need of passing through a cylindrical lens first. The MEMS oscillatory mirror 22 may oscillate in a harmonic motion at a certain oscillating amplitude, so as to control a direction in which incident laser beams are reflected, and cause the laser beams to reflect onto the fθ lens 23 located at one side of the MEMS oscillatory mirror 22 to achieve a scanning linearity required by the laser scanning unit.

In the harmonic motion of the MEMS oscillatory mirror 22 of the laser scanning unit 2, there are two ways that may be employed to achieve the required scanning linearity, namely, electric modulation and optical modulation.

First, the electrical modulation means modulation of laser input signal, so that the laser input signal is synchronized with the harmonic motion of the MEMS oscillatory mirror 22.

Second, in the optical modulation, the fθ lens is changed in design. That is, a parameter of the lens is changed from θ to sin θ, so that the fθ lens is changed to an f sin θ lens to match the harmonic motion of the MEMS oscillatory mirror 22.

In accordance with the currently available electronic technique or technique for forming an fθ lens, both of the above two modulation ways may be successfully implemented to achieve the required scanning linearity.

The inclusion of the MEMS oscillatory mirror 22 in the laser scanning unit 2 of the present invention to substitute for the conventional rotary polygon mirror 14 provides at least the following advantages:

1. It is no longer necessary to include a cylindrical lens in the laser scanning unit, allowing the fθ lens to have an optical design that is more robust and has higher tolerance.
2. Unlike the conventional laser scanning unit 1 using the polygonal mirror 14, the laser scanning unit 2 of the present invention does not have a deviation of the central axis of laser beams from the mechanical center of the MEMS oscillatory mirror 22. Thus, it is possible to consider only a symmetric optical field in designing the fθ lens 23 and thereby simplify the design and manufacture of the fθ lens 23.
3. Once the harmonic motion of the MEMS oscillatory mirror 22 is started, a working rotational speed thereof can be quickly reached almost without any waiting period. Moreover, the MEMS oscillatory mirror 22 may have a relatively high operating speed when it is compared to the polygonal mirror 14 that is driven to rotate by an air-bearing motor. Therefore, the MEMS oscillatory mirror 22 has improved scanning amplitude efficiency.
4. The harmonic motion of the MEMS oscillatory mirror 22 includes flip-flop oscillations at regular oscillating amplitude to allow bi-directional scanning. Therefore, when the operating speed is the same, the bi-directional scanning of the MEMS oscillatory mirror 22 is twice as quick as the one-directional scanning of the polygonal mirror 14, enabling the laser scanning unit of the present invention to have improved scanning efficiency.

The present invention has been described with a preferred embodiment thereof and it is understood that many changes and modifications in the described embodiment can be carried out without departing from the scope and the spirit of the invention that is to be limited only by the appended claims.

What is claimed is:

1. A laser scanning unit comprising:
   a) a semiconductor laser emitting laser beams;
   b) a collimator receiving laser beams from the semiconductor laser and emitting parallel beams;
   c) a lens being one of a F sin θ lens located in a fixed position therein; and
   d) a micro electronic mechanical system (MEMS) oscillatory mirror located between the collimator and the F sin θ lens,
   wherein the collimator directly projecting the parallel beams onto the micro electronic mechanical system (MEMS) oscillatory mirror, the micro electronic mechanical system (MEMS) oscillatory mirror directly reflecting the parallel beams onto the lens, the micro electronic mechanical system (MEMS) oscillatory mirror oscillating in a harmonic motion at regular oscillating amplitude and controlling a direction the parallel beams are reflected onto the lens thereby providing a linear scanning effect.

2. The laser scanning unit according to claim 1, wherein the micro electronic mechanical system (MEMS) oscillatory mirror is located adjacent to the collimator.

3. The laser scanning unit according to claim 1, wherein the laser beams emitted by the semiconductor laser have a central axis that is aligned with a mechanic center of the micro electronic mechanical system (MEMS) oscillatory mirror.

4. The laser scanning unit according to claim 1, wherein the lens is the F sin θ lens has a parameter matching the harmonic motion of the micro electronic mechanical system (MEMS) oscillatory mirror.

5. The laser scanning unit according to claim 1, wherein the F sin θ lens has an elongated shape with elongated sides, the parallel beams passing through an opposing pair of the elongated sides.

* * * * *